United States Patent
Nagasaka

(10) Patent No.: US 7,764,410 B2
(45) Date of Patent: Jul. 27, 2010

(54) IMAGE SCANNER AND COPYING APPARATUS

(75) Inventor: Hideaki Nagasaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 361 days.

(21) Appl. No.: 11/860,157

(22) Filed: Sep. 24, 2007

(65) Prior Publication Data

US 2008/0180756 A1 Jul. 31, 2008

(30) Foreign Application Priority Data

Sep. 27, 2006 (JP) ............................. 2006-262752

(51) Int. Cl.
H04N 1/46 (2006.01)
H04N 1/04 (2006.01)

(52) U.S. Cl. .................. 358/504; 358/474; 358/1.9; 358/505; 358/509; 358/514

(58) Field of Classification Search ................. 358/504, 358/1.9, 404, 405, 406, 501, 505, 509, 510, 358/514, 516, 474; 345/175, 156, 173, 178
See application file for complete search history.

(56) References Cited

U.S. PATENT DOCUMENTS 5,580,045 A * 12/1996 Matsumoto et al. ......... 271/298
6,587,099 B2 * 7/2003 Takekawa .................... 345/175
7,385,738 B2 * 6/2008 Hori ............................. 358/504
2004/0141212 A1 7/2004 Hori
2006/0253610 A1 * 11/2006 Yamada et al. .............. 709/245

FOREIGN PATENT DOCUMENTS

| JP | 05-103237 | 4/1993 |
|---|---|---|
| JP | 2002-027182 | 1/2002 |
| JP | 2004-215177 | 7/2004 |

* cited by examiner

Primary Examiner—Charlotte M Baker
(74) Attorney, Agent, or Firm—Banner & Witcoff, Ltd

(57) ABSTRACT

An image scanner including a plurality of light receiving units, a signal processing device, a connector and a determination device is provided. The plurality of light receiving units receive reflected light from an object to be scanned per each pre-divided area. The signal processing device processes output signals from each of the light receiving units to generate image data. The connector is connected to a plurality of output signal lines from the light receiving units so that the output signal lines are collectively connected to the signal processing device via the connector. The determination device receives the output signals from each of the light receiving units to the signal processing device via the connector, and determines whether the output signals from the light receiving units to the signal processing device are normal based on a signal level of the output signals.

13 Claims, 8 Drawing Sheets

IMAGE SCANNER AND COPYING APPARATUS

CROSS-REFERENCE TO RELATED APPLICATIONS

This application claims the benefit of Japanese Patent Application No. 2006-262752 filed Sep. 27, 2006 in the Japan Patent Office, the disclosure of which is incorporated herein by reference.

BACKGROUND

This invention relates to an image scanner which can detect a poor connection between a scanning device and a controller. This invention also relates to a copying apparatus including such image scanner.

There is a known conventional image scanner in which a scanning device and a controller are connected via a connector. The scanning device scans an image from an original, while the controller processes a signal from the scanning device thereby to produce image data. A technology for determining whether the scanning device is normally connected or not by analyzing image data obtained from the scanning device at a controller side has been proposed.

SUMMARY

There is an image scanner constituted by a plurality of light receiving units so that, for example, a scanning speed increases. Such image scanner is configured such that each of the light receiving units operates in parallel.

Since connecting each of the light receiving units to the controller via separate connector decreases productivity, it is considered that the image scanner of this type may be configured such that signal lines from the light receiving units are linked to one connector, thereby to be connected to the controller via the connector.

However, in the image scanner constituted as mentioned above, when a poor connection between the scanning device and the controller is detected using the above proposed technology, a connection status between a whole of a plurality of light receiving units and the controller can be determined, but a connection status between each of the light receiving units and the controller may not be determined in some cases.

Briefly, in the above-proposed technology, image data obtained from one scanning device is analyzed thereby to detect a poor connection of the scanning device. Accordingly, when the scanning device is constituted by a plurality of light receiving units and when image data obtained from each of the light receiving units is sequentially taken in at a controller side, determination of connection status for each of the light receiving units becomes impossible.

The present invention is made to solve the above-mentioned problem. It would be desirable to provide an image scanner in which a scanning device is constituted by a plurality of light receiving units such that respective connection status between each of the light receiving units and the controller can be accurately determined.

One aspect of the present invention may provide an image scanner including a plurality of light receiving units, a signal processing device, a connector and a determination device. The plurality of light receiving units receive reflected light from an object to be scanned per each pre-divided area. The signal processing device processes output signals from each of the light receiving units to generate image data. The connector is connected to a plurality of output signal lines from the light receiving units so that the output signal lines are collectively connected to the signal processing device via the connector. The determination device receives the output signals from each of the light receiving units to the signal processing device via the connector, and determines whether the output signals from each of the light receiving units to the signal processing device are normal based on a signal level of the output signals.

Thus, according to the image scanner of the present invention, the determination device receives the output signals from each of the light receiving units, and thereby determines whether a signal input is normal per each of the light receiving units. For this reason, even though the scanning device is divided into a plurality of light receiving units, it can be determined whether output signals from each of the light receiving units is normally inputted to the signal processing device via the signal output line and the connector. Therefore, according to the present invention, abnormity in the output signals from each of the light receiving units to the signal processing device can be detected, and thereby a defective image scanning can be inhibited from occurring.

Another aspect of the present invention relates to a copying apparatus including the above-mentioned image scanner and an image forming apparatus. The image forming apparatus forms an image based on image data generated by the image scanner. According to the copying apparatus, the same effect as the above-mentioned image scanner can be provided.

DETAILED DESCRIPTION OF THE PREFERRED EMBODIMENT

A preferred embodiment of the present invention will be described hereinafter.

<Overall Structure of Multi Function Apparatus>

Figure 1:
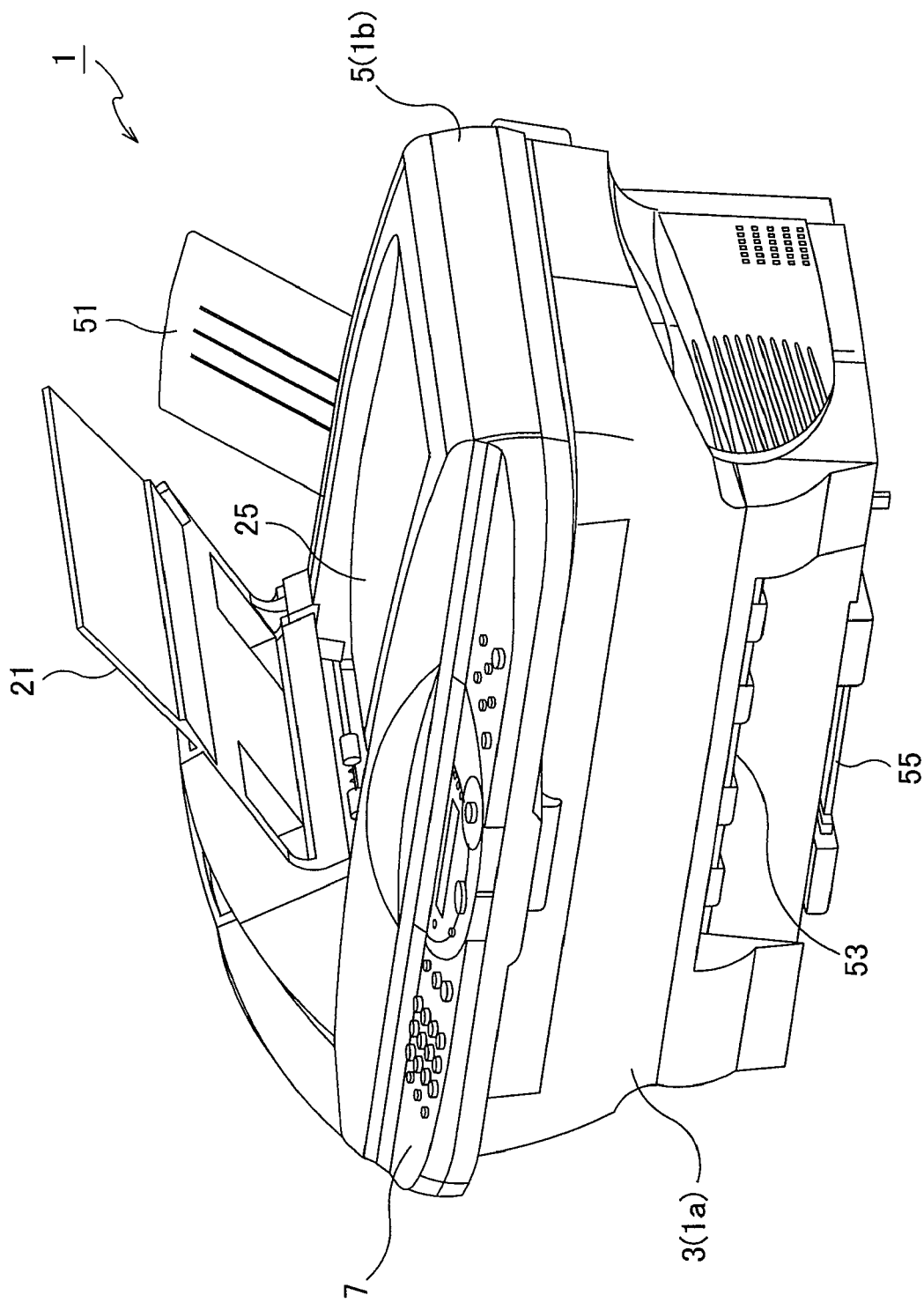
FIG. 1 is a perspective view showing an overall structure of a multi function apparatus of the present embodiment.

FIG. 1 is a perspective view showing an overall structure of a multi function apparatus 1 functioning as an image scanner, a printer, a copying machine and a facsimile.

As shown in FIG. 1, the multi function apparatus 1 includes a clam-shell type opening/closing structure with an upper side body 1b attached to a lower side body 1a in an openable/closable manner. The multi function apparatus 1 is configured such that an image forming apparatus 3 (a laser printer in the present embodiment) is incorporated in the lower side body 1a, while an image scanner 5 is incorporated in the upper side body 1b. Furthermore, an operation panel 7 is arranged at a front side of the upper side body 1b.

The image scanner 5 is of a type in which both a flat bed mechanism (also referred to as FB hereinafter) and an automatic document feeder mechanism (also referred to as ADF hereinafter) are included. The flat bed mechanism scans an image from an original placed thereon. The automatic document feeder mechanism scans an image while conveying an original to an image scanning position. Also, the image scanner 5 itself includes a clam-shell type opening/closing structure in which a cover portion 5b is attached to a flat bed portion 5a in an openable/closable manner.

Figure 2:
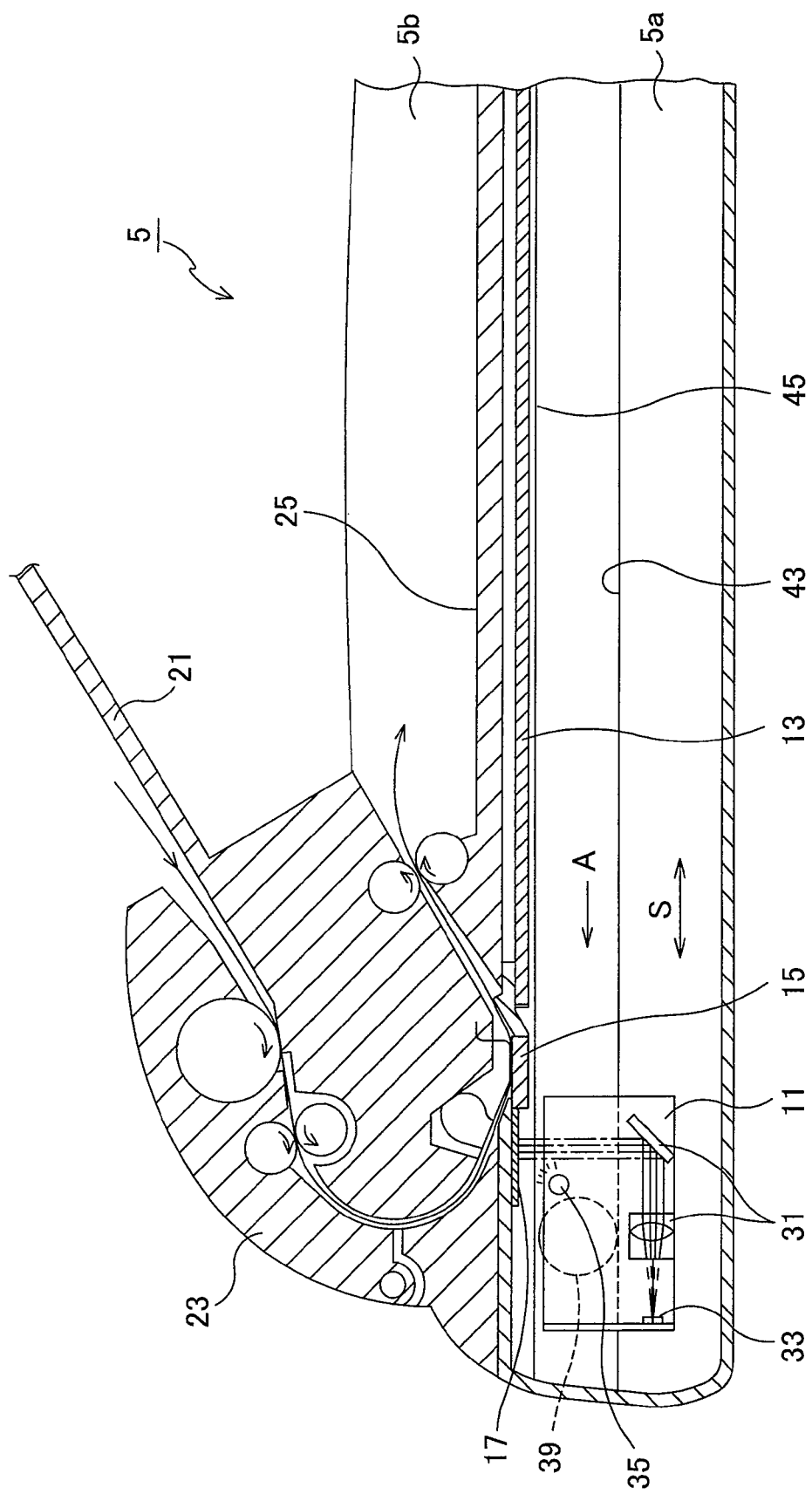
FIG. 2 is a cross-sectional view showing a structure of an image scanner disposed to the multi function apparatus.

In the image scanner 5, the flat bed portion 6a is provided with, as shown in FIG. 2, a scanning head 11, a first platen glass 13, a second platen glass 15, a white plate 17, or the like. The cover portion 5b is provided with an original feeding tray 21, an original conveying unit 23, an original discharging tray 25, or the like.

The scanning head 11, which is of a so-called CIS (Contact Image Sensor) system, includes an image sensor 31 constituted by a plurality of line sensors, an optical element 33 constituted by a lens, and light sources 35 for illuminating the object to be scanned.

Specifically, the light source 35 illuminates an original existing in a scanning object position, and the image sensor 31 directly receives a reflected light from an original via the optical element 33, whereby the image sensor 31 in the scanning head 11 scans an image of one line in a main scanning direction.

Figure 3:
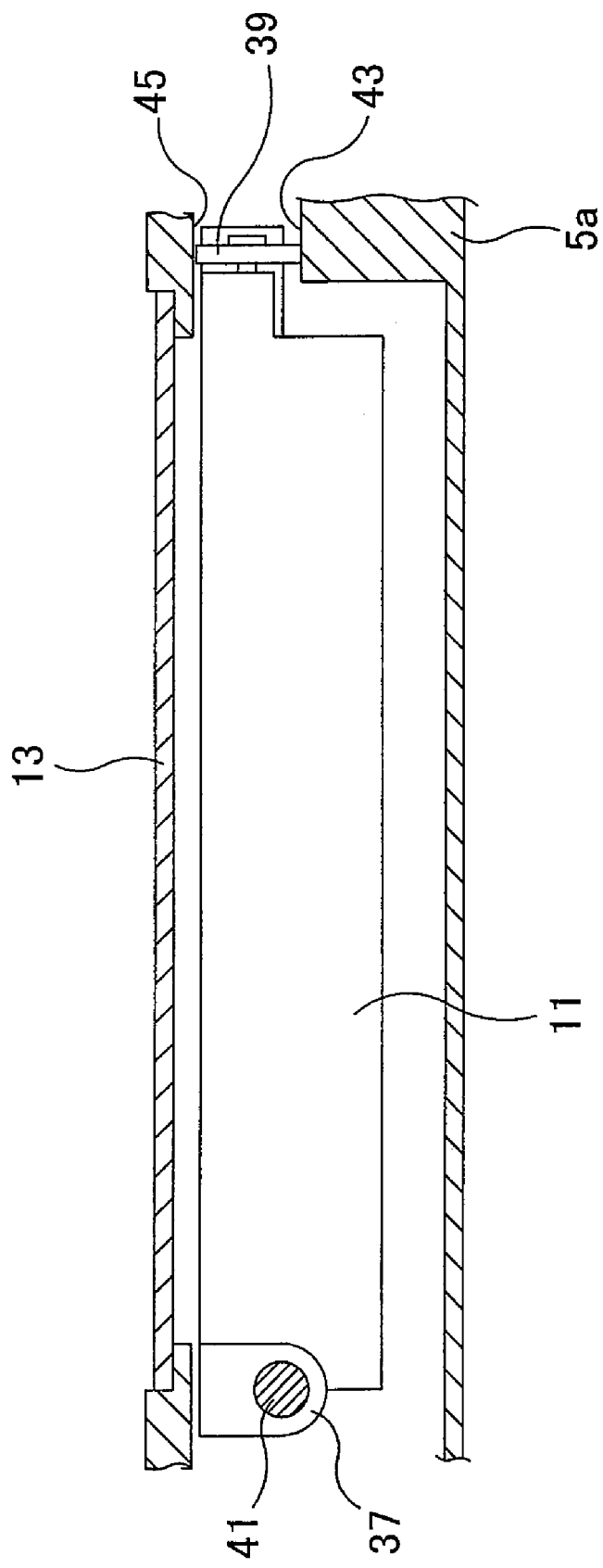
FIG. 3 is a cross-sectional view showing a scanning head and its vicinity as seen from a direction of arrow A in FIG. 2.

As shown in FIG. 3, one end of the scanning head 11 is provided with a bearing 37 and the other end of the scanning head 11 is provided with a roller 39. A guide bar 41 passes through the bearing 37. The guide bar 41 is set in parallel with respect to the first platen glass 13, the second platen glass 15, and the white plate 17 within the flat bed portion 5a. In addition, the roller 39 is mounted on a guide surface 43 extending in a sub-scanning direction S shown in FIG. 2 within the flat bed portion 5a. Accordingly, the scanning head 11 is hung between the guide bar 41 and the guide surface 43 so as to reciprocate in the sub-scanning direction S along the guide bar 41.

As shown in FIG. 2 and FIG. 3, a part of the top side of the roller 39 projects over the scanning head 11, and a guide portion 45 is formed so that a very small space (a space of approximately 0.5 mm in the present embodiment) is generated between the top of the roller 39 and the guide portion 45. This structure allows the roller 39 to contact with the guide portion 45, when a force for rotating the scanning head 11 around the guide bar 41 acts on the scanning head 11 due to oscillation or the like generated when transferring the multi function apparatus 1. Accordingly, since a rotation of the scanning head 11 is regulated, the scanning head 11 is inhibited from colliding with the first platen glass 13, the second platen glass 15, and the white plate 17.

The first platen glass 13 is used for scanning an image from an original at a FB side. When an image is scanned from an original using the FB, a user places the original on the first platen glass 13, presses the original onto the first platen glass 13 with the cover portion 5b, and performs a predetermined operation (e.g., pushes a scanning start button) with the operation panel 7 while the original is pressed thereonto. This allows a step motor 27 (see FIG. 4) for transferring the scanning head 11 to drive so as to scan the image from the original while moving the scanning head 11 in a sub-scanning direction S along the guide bar 41.

The second platen glass 15 is used for scanning an image from an original at a ADF side. When an image is scanned from the original using the ADF, a user sets the original on the original feeding tray 21, and performs a predetermined operation (e.g., pushes the scanning start button) with the operation panel 7 while the original is set thereon. This allows the original conveying unit 23 to operate so as to convey the original from the original feeding tray 21 to the original discharging tray 25. Then, the image is scanned from the original passing through on the second platen glass 15 in the sub-scanning direction while the scanning head 11 is placed below the second platen glass 15.

The white plate 17 is a member having a uniform density of white color. An image is scanned from the white plate 17 such that a white level correction data required for converting actual measurement data into ideal data is acquired. After that, a white level correction process (a shading correction process) is performed using the white level correction data.

The image forming apparatus 3 is incorporated in the lower side body 1a of the multi function apparatus 1. As shown in FIG. 1, the image forming apparatus 3 takes in a sheet-shaped recording medium (e.g., paper) from a paper feed tray 51 located at a back side of the multi function apparatus 1. The image forming apparatus 3 forms an image on a recording face of the recording medium, and discharges the recording medium with the image recorded thereon from a paper exit port 53 located at a front side of the multi function apparatus 1. A slide-out paper exit tray 55 is housed below the paper exit port 53. The paper exit tray 55 is pulled out as necessary and can receive a recording paper discharged from the paper exit port 53.

The operation panel 7 includes a numeric keypad, cursor keys, buttons and switches, a liquid crystal panel, or the like. The numeric keypad is used for inputting numeric values. The cursor keys are used for selecting a direction in a cross-wise direction. The buttons and switches are used for inputting various commands. The liquid crystal panel displays a menu screen and an error message. Therefore, a user can specify an operation mode or the like using these buttons and switches. Also, a user can select a variety of menu items from the menu screen displayed on the liquid crystal panel so as to set an operation mode or the like and display other menu screens.

<Overall Structure of Control System>

Figure 4:
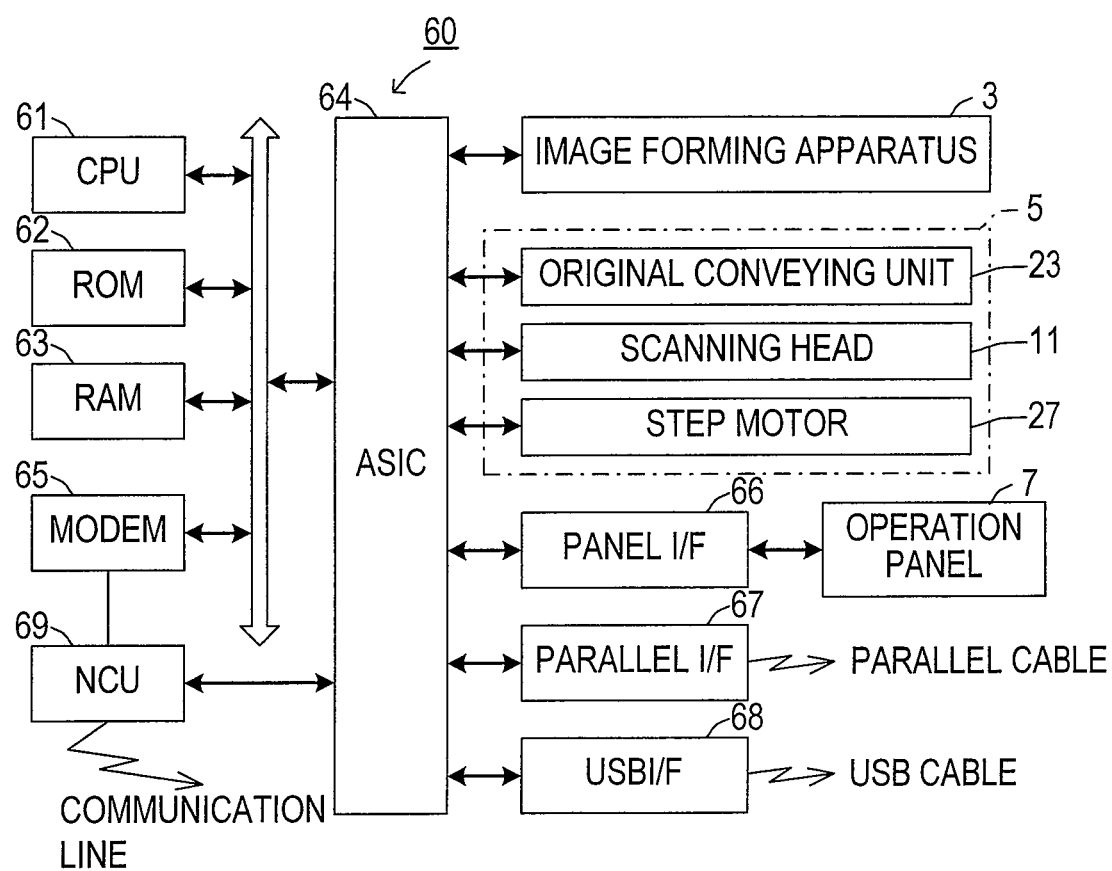
FIG. 4 is a block diagram showing a control system of the multi function apparatus.

As shown in FIG. 4, a controller 60 is disposed to the multi function apparatus 1. The controller 60 controls an overall operation of the multi function apparatus. The controller 60 is constituted by a microcomputer as a major component. The microcomputer includes a CPU 61, a ROM 62, a RAM 63, or the like.

The controller 60 also includes an ASIC (Application Specific Integrated Circuit) 64 and a modem 65. The ASIC 64 is connected with each of the above-mentioned components of the microcomputer via a bus.

The ASIC 64 is connected with the image forming apparatus 3, the image scanner 5 (specifically, the original conveying unit 23, the scanning head 11, and the step motor 27 as described above), a panel interface 66, a parallel interface 67, a USB interface 68, and a network control unit (NCU) 69.

The panel interface 66 is used for inputting and outputting a signal to and from an operation panel 7. The parallel interface 67 is used for inputting and outputting image information to and from an external personal computer (PC) or the like. The USB interface 68 is used for inputting and outputting image information to and from an external device including a PC and a digital camera. The NCU 69 is used for transmitting information via an external facsimile device and a public line.

The ASIC 64 controls the image forming apparatus 3, the image scanner 5, and NCU 69 according to a variety of control parameters set in an inside register by operation of the CPU 61 so as to make the multi function apparatus 1 serve as a printer, an image scanner, a copying machine, and a facsimile device.

The ASIC 64 also serves as a relay device to provide input data from each of the above interfaces 66 to 68 to the CPU 61, and to provide input data from the CPU 61 to the operation panel 7 and an external device via each of the above interfaces 66 to 68.

<Structure of Image Sensor>

A description of an image sensor 31 will now be provided below.

Figure 5:
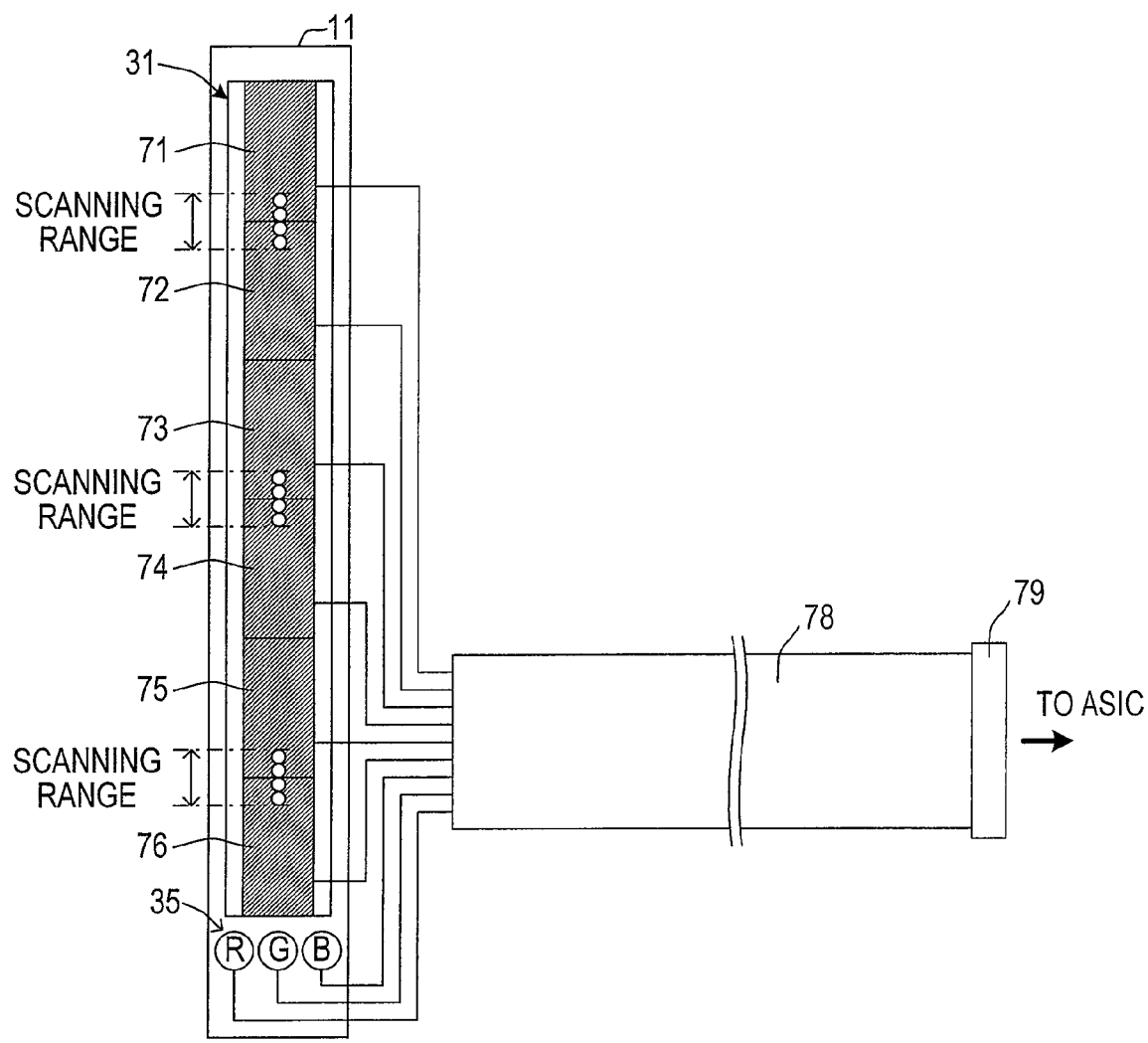
FIG. 5 is an explanatory view showing a structure of an image sensor.

As shown in FIG. 5, the image sensor 31 includes six light receiving units 71 to 76, each of which is assigned to CH1 to CH 6 (CH represents a channel) respectively. Each of the six light receiving units 71 to 76 includes a line sensor in which a number of photoelectric conversion devices are aligned in a line. In the image scanner 5, a whole scanning area for one line of a main scanning direction is divided into six to form the six light receiving units 71 to 76.

When a scanning start command is inputted from ASIC 64, each of the light receiving units 71 to 76 latches a light receiving signal from the photoelectric conversion device constituting each pixel. Subsequently, each of the light receiving units synchronizes with a pixel clock signal, and then outputs a light receiving signal in order starting from a pixel located at one end.

For this reason, an output signal line used for outputting the light receiving signal in order and an input signal line used for inputting a control signal from the ASIC 64 are pulled out from each of the light receiving units 71 to 76. The signal lines of each of these light receiving units 71 to 76 are collectively connected to a flexible flat cable (hereinafter, referred to as "FFC"), and then connected to a circuit board, to which the ASIC 64 is mounted, via a connector 79 provided on the other end of the FFC.

The circuit board includes an analog front end (AFE). The AFE firstly latches an output signal (a light receiving signal of each pixel) from each of the light receiving units 71 to 76, and then converts the latched output signal from analog to digital sequentially to provide the converted signal to the ASIC 64 in a time-sharing manner.

The ASIC 64 generates image data of one line of a main scanning direction from pixel data sequentially inputted via the AFE.

The scanning head 11 includes the light sources 35, which includes three colors of red (R), green (G) and blue (B). A signal line pulled out from each of the light sources 35 is also connected to the FFC 78 and the connector 79 to be connected to the ASIC 64.

<Connection Status Determination Operation>

Figure 6:
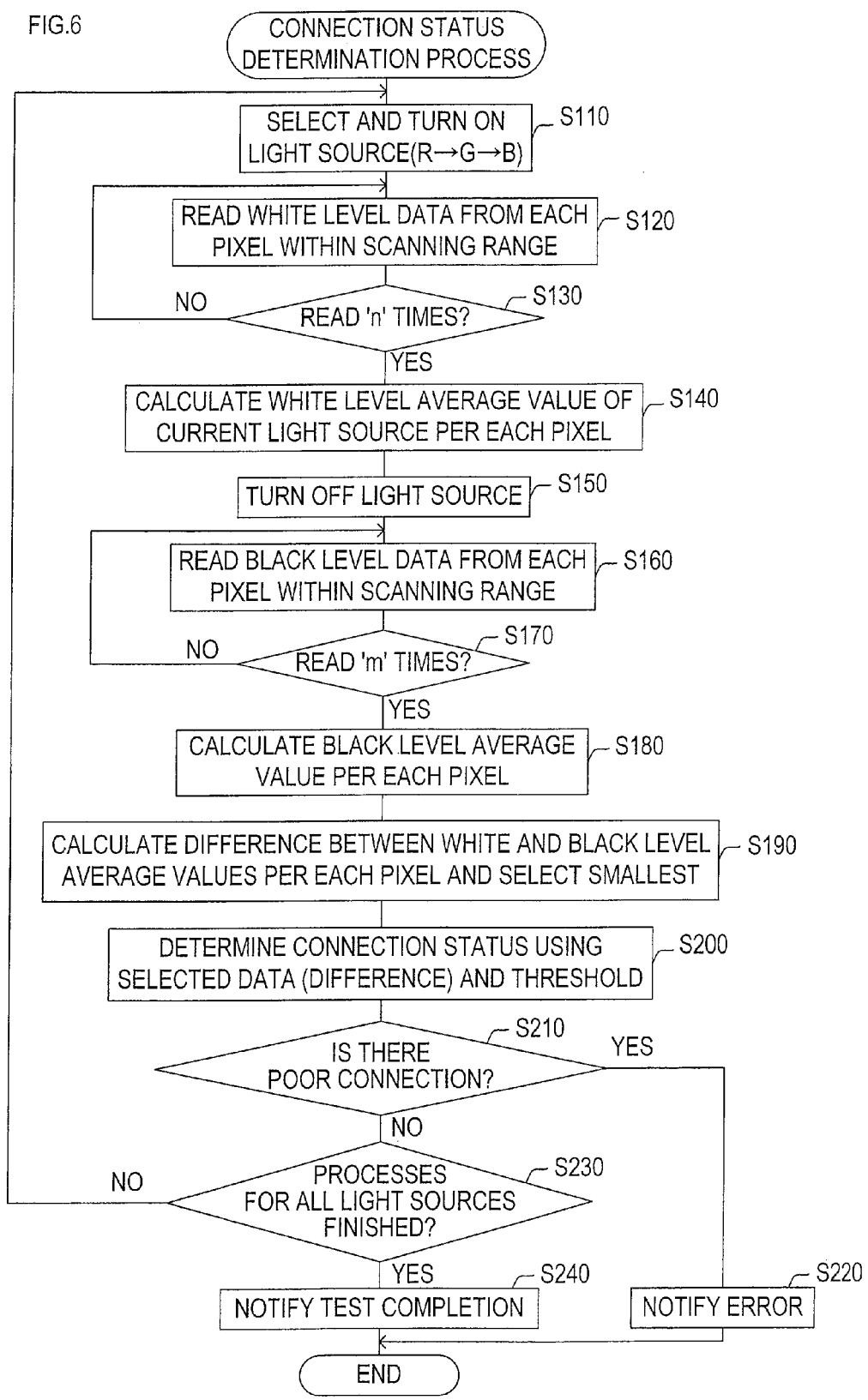
FIG. 6 is a flowchart showing a connection status determination process executed in CPU.

Next FIG. 6 is a flowchart showing a connection status determination process executed in the CPU 61 in order to determine whether the image sensor 31 is normally connected to the circuit board of the ASIC 64 via the FFC 78 and the connector 79.

The connection status determination process is a process executed in the CPU 61 when a command to check a connection status is inputted via the operation panel 7. When the process is executed, the scanning head 11 is to be fixed in a position where an image can be scanned from the white plate 17.

As shown in FIG. 6, when the connection status determination process is started, firstly in S110 ("S" represents a "step"), one of the above-mentioned three light sources 35 having different colors respectively (for example, light source with a color of red (R)) is selected, and the selected light source is turned on. Then, in subsequent S120, pixel data is obtained from pixels within a scanning range predetermined in order to determine a connection status of the image sensor 31 via the ASIC 64. The pixel data is stored as white level data with respect to the light source 35 which is currently turned on.

A partial area is predetermined as a scanning range of the white level data obtained in S120, as shown in FIG. 5. A start point and an end point of the partial area are set so as to straddle between neighboring light receiving units within an entire scanning area of the image sensor 31. The scanning range is set so as to become one continuous location in each of the light receiving units 71 to 76.

Specifically, three scanning ranges are set. Each of the scanning ranges include a partial area extending from the light receiving unit 71 to the light receiving unit 72, a partial area extending from the light receiving unit 73 to the light receiving unit 74, and a partial area extending from the light receiving unit 75 to the light receiving unit 76.

After the pixel data (the white level data) is read from pixels within each of the above-mentioned scanning ranges in S120, it is determined in S130 whether reading of the white level data in S120 has been performed predetermined 'n' times.

If the reading of the white level data in S120 has not been performed 'n' times, the present process returns to S120, and scanning of the white level data is performed repeatedly. If the scanning of the white level data in S120 has been executed 'n' times, the present process proceeds to S140, and then calculation of an average value of the white level data scanned 'n' times (a white level average value) is performed per each pixel within each of the above-mentioned scanning ranges. Then the present process proceeds to S150.

Next in S150, the light source 35, which is currently turned on, is turned off, and in S160, pixel data is obtained from pixels within each of the above-mentioned scanning ranges with a same procedure as S120. The data is stored as black level data.

In subsequent S170, it is determined whether the reading of the black level data in S150 has been performed predetermined 'm' times. If the reading of the black level data has not been performed 'm' times, the present process returns to S160, and then the reading of the black level data is performed repeatedly.

If the reading of the black level data in S160 has been performed 'm' times, the present process proceeds to S180, and then calculation of an average value of the black level data scanned 'm' times (a black level average value) is performed per each pixel within each of the above-mentioned scanning ranges. Then the present process proceeds to S190.

In S190, calculation of a difference between the white level average value calculated in S140 and the black level average value calculated in S180 is performed per each pixel within each of the above-mentioned scanning ranges. A calculated smallest difference is selected as data for determining a connection status.

In subsequent S200, the selected data (difference) is compared with a predetermined threshold, and thereby it is determined whether the connection status is normal.

Specifically, when the image sensor 31 is normally connected to the ASIC 64 and is normally operated, the difference between the white level average value and the black level average value becomes bigger. At the same time, when abnormity such as a poor connection has occurred, there is little difference between the white level average value and the black level average value.

Then, in S200, comparison between a smallest value of differences and the threshold is performed. If the smallest value is equal to or smaller than the threshold, it is determined that the image sensor 31 is not normally connected to the circuit board of the ASIC 64.

In subsequent S210, it is determined whether a poor connection of the image sensor 31 has been determined by the determination process in S200. If it has been determined that a poor connection has occurred, the present process proceeds to S220. In S220, an error message to notify that the image sensor 31 is not normally connected is displayed on the liquid crystal panel disposed to the operation panel 7. At the same time, a predetermined error notification sound is generated from a speaker (not shown) to notify a user of a poor connection, and then the connection status determination process is terminated.

When it is determined that a poor connection is not determined in S210, the present process proceeds to S230, and then it is determined whether the above-mentioned processes S120 to S140 have been executed with respect to three color light sources 35. If the processes S120 to S140 have not been executed with respect to all of the three light sources 35, the present process returns to S110. Then, after the green (G) light source 35 or the blue (B) light source 35, which has not been turned on, is selected and turned on, a series of processes S120 to S210 are executed repeatedly. In this case, S150 to S180 may be skipped, and the black level average value calculated when the red (R) light source is confirmed to be turned on may be used.

When it is determined the above-mentioned processes of S120 to S140 are executed with respect to all of the three light sources 35 in S230, the present process proceeds to S240. Then a message that indicates that the image sensor 31 is normally connected is displayed on the liquid crystal panel disposed to the operation panel 7. At the same time, a notification sound that notifies a termination of inspection is generated from a speaker (not shown), and then the connection status determination process is terminated.

<Effect of Embodiment>

As described above, in the image scanner 5 of the present embodiment, the image sensor 31 includes a plurality of light receiving units 71 to 76. The output signal line pulled out from each of the light receiving units 71 to 76 is connected to the FFC 78. The output signal line is connected to the circuit board of the ASIC 64 via the connector 79 disposed on the FFC 78.

A partial area is predetermined as a scanning range of pixel data to be scanned by the image sensor 31 in order to determine a connection status between the image sensor 31 and the ASIC 64. A start point and an end point of the partial area are set so as to straddle between the neighboring light receiving units in addition that the partial area is set so as to become one location in each of the light receiving units 71 to 76. In other words, the partial area is set neither between the light receiving units 72 and 73 nor between the light receiving units 74 and 75.

When actually determining the connection status, pixel data (white level data and black level data) is read per each pixel within each scanning range both when the light sources 35 are turned on and off. When a smallest value of differences between average values of respective data (white level average value and black level average value) is equal to or smaller than the threshold, it is determined that a poor connection has occurred.

Therefore, according to the present embodiment, it can be accurately determined whether output signals from each of the light receiving units 71 to 76 is normally inputted to the circuit board of the ASIC 64 via the FFC 78 and the connector 79. Accordingly, an image scanning trouble due to a poor connection can be inhibited from occurring.

In addition, according to the present embodiment, since the scanning range of pixel data to be scanned per each of the light receiving units 71 to 76 is set as described above in order to determine a connection status, the number of scanning operations when the white level data and the black level data are scanned by the image sensor 31 in S120 to S160 is less than the number of scanning operations when the scanning range is set for each of the light receiving units. Therefore, according to the present embodiment, determination of a connection status can be performed in a shorter time.

Also, in the present embodiment, the light sources 35 illuminating light for scanning an image to an object to be scanned include a red (R) light source, a green (G) light source and a blue (B) light source. Determination of a connection status is performed for each light source 35. For this reason, for example, even when one of the three light sources 35 fails to be turned on and a color image is unable to be scanned in a normal manner, such abnormality can be detected.

Furthermore, in the present embodiment, when a poor connection has been detected, even if a connection status of other light source 35 has not been determined yet, the determination operation is stopped, and the poor connection is notified with a display message and a sound. In this way, according to the present embodiment, a component in which a poor connection occurs can be detected in a shorter time. Performing the above-mentioned connection status determination process in a production process of the component can cause a production efficiency thereof to improve.

<Modified Form 1>

Although the preferred embodiment of the present invention has been described above, it will be understood that the present invention should not be limited to the above embodiment but may be embodied in various forms without departing from the spirit and scope of the present invention.

For example, in the above-mentioned embodiment, it has been described that, in the connection status determination process, every time a series of processes of S110 to S140 are executed, the black level average value is calculated (S150 to S180), and then it is determined whether a poor connection has occurred (S190 to S210). In the series of processes of S110 to S140, one of the three light sources 35, each of which has a different color, is turned on and a white level average value is calculated.

Figure 7:
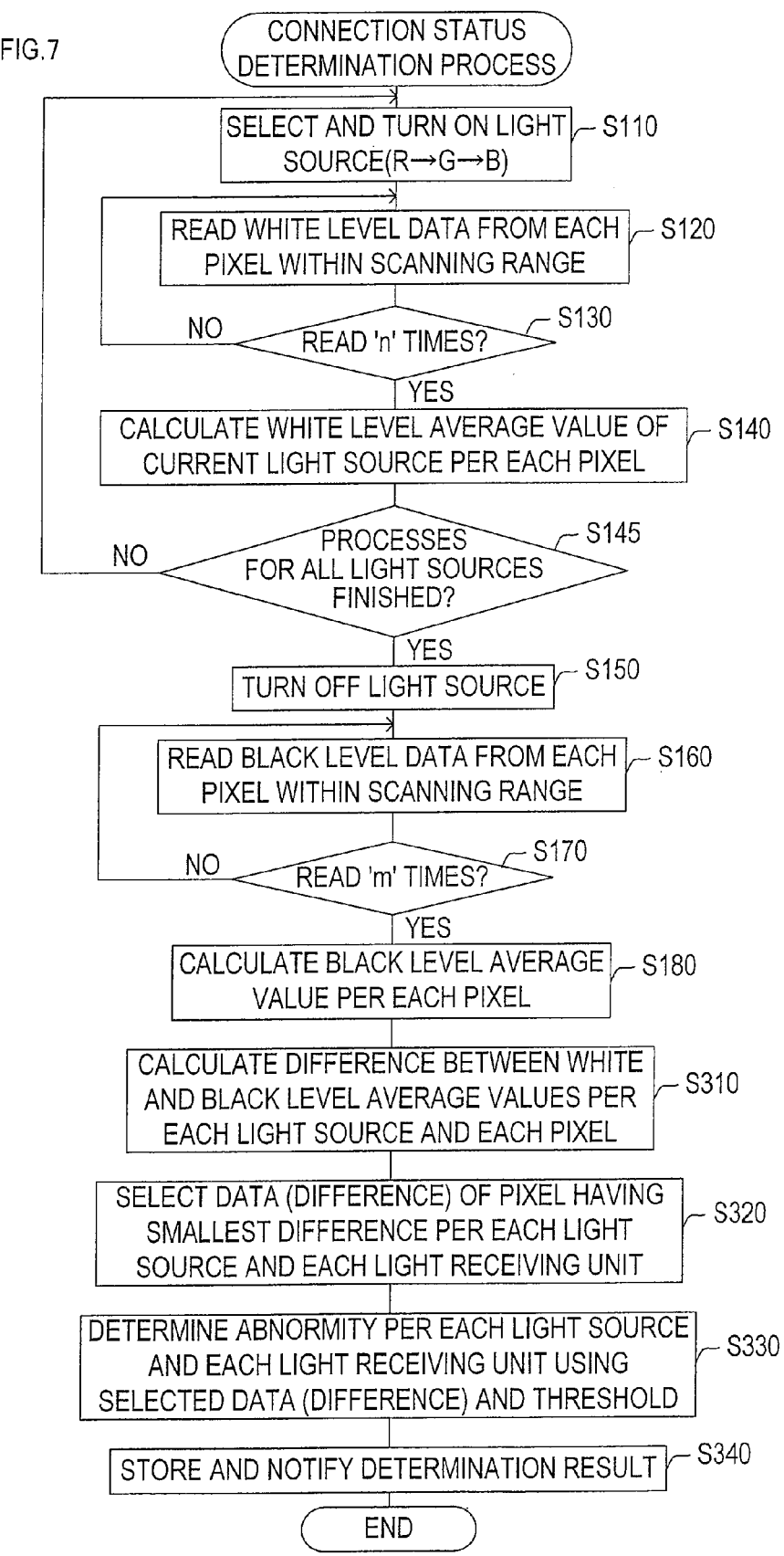
FIG. 7 is a flowchart showing a connection status determination process of Modified Form 1.

Alternatively, as shown in FIG. 7, after the series of processes of S110 to S140 have been performed, it may be determined in S145 whether the series of processes have been performed for each of the three light sources 35. In a case where the processes have not been performed for each of the three light sources 35, the present process may return to S110, and then a green (G) light source 35 or a blue (B) light source 35, which has not been turned on yet, may be turned on to calculate a white level average value for each light source 35. Subsequently, a black level average value may be calculated (S150 to S180).

Also, in this case, after the black level average value is calculated in S180, a difference between a white level average value and a black level average value may be calculated for each light source and each pixel in S310. In S320, data (difference) of the pixel having the smallest difference may be selected from the calculated differences per each light source and each of the light receiving units. In subsequent S330, the selected data (difference) may be compared to the threshold thereby to determine whether a connection status is normal per each light source and each of the light receiving units.

Specifically, in S330, it is determined whether only a part or all of the data (differences) selected per each light source and each of the light receiving units is equal to or smaller than the threshold. Accordingly, it becomes possible to determine whether some of the three light sources 35 have abnormity, or all thereof is normal but some or all of the light receiving units 71 to 76 have a poor connection.

Finally, in S340, the abnormity determination result obtained by S330 is informed to a user by displaying a message on the liquid crystal panel and outputting a notification sound from a speaker. When this process as an annunciation device is executed, the user can easily specify a cause of the abnormity based on the notification thereby to take a necessary countermeasure (repair, part replacement, or the like) after the abnormity has been detected.

<Modified Form 2>

Figure 8:
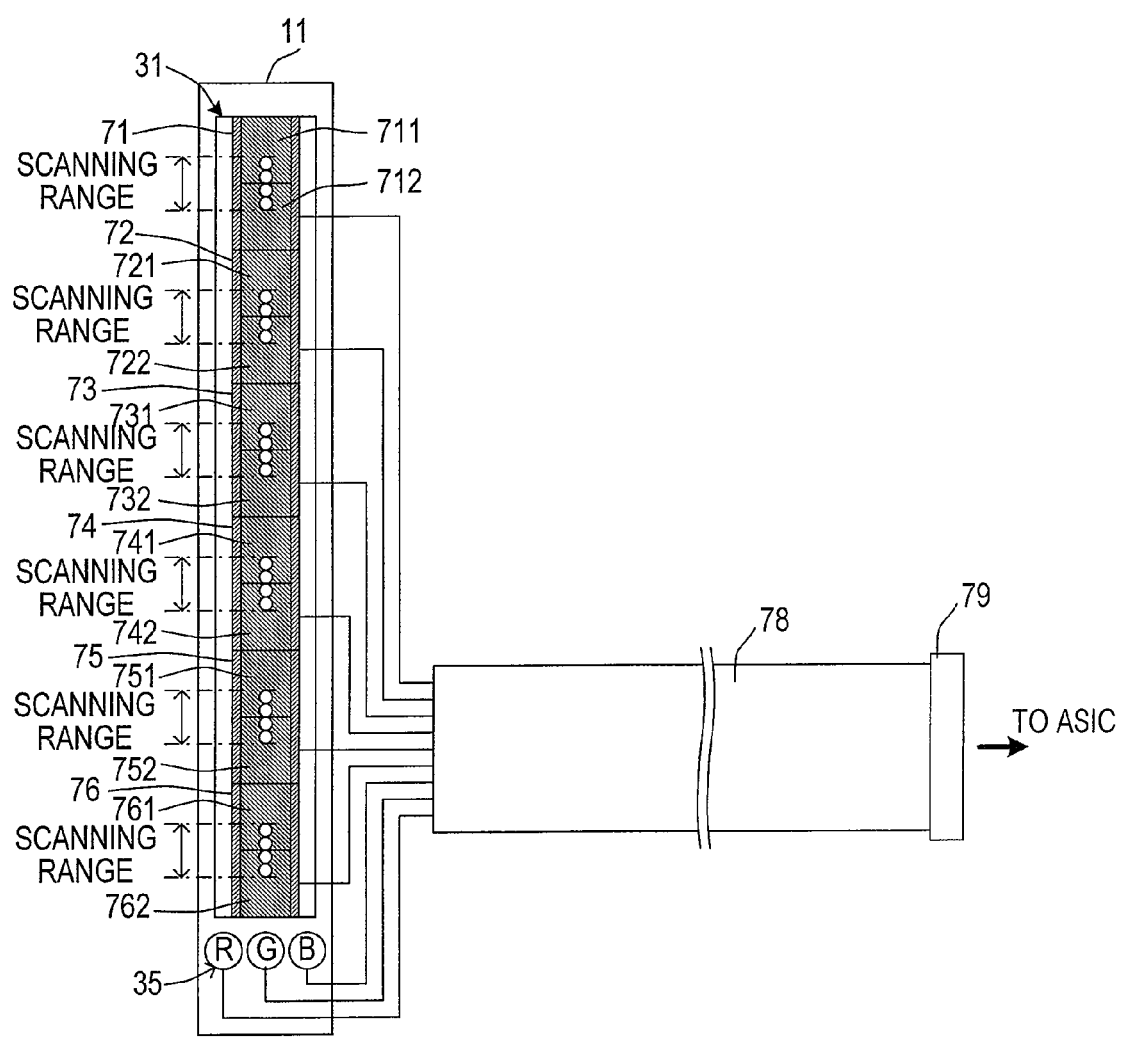
FIG. 8 is an explanatory view showing a structure of the image sensor of Modified Form 2.

Fox example, as shown in FIG. 8, in a case where each of the light receiving units 71 to 76 includes two light receiving ICs (Integrated Circuits) 711 and 712 through 761 and 762 respectively, if a scanning range for determining a connection status of the image sensor 31 is set in the same manner as the above-mentioned embodiment, abnormity may not be detected in some cases when either of the two light receiving ICs 711 and 712 through 761 and 762, which constitutes the light receiving units 71 to 76 respectively, is at fault.

For this reason, in a case where each of the light receiving units 71 to 76 is constituted by the two light receiving ICs 711 and 712 through 761 and 762 as described above, as shown in FIG. 8, a partial area may be set as a scanning range of pixel data for determining a connection status (white level data and black level data). A start point and an end point of the partial area are set so as to straddle between the neighboring light receiving ICs, and the partial area is set so as to become one location in each light receiving IC.

In this way, although the scanning range is to be set in each of the light receiving units 71 to 76, it becomes possible that abnormity is determined by executing the connection status determination process shown in FIG. 6 or FIG. 7 even if one of the two light receiving ICs constituting each of the light receiving units 71 to 76 has abnormity.

<Other Modified Form>

In the above-mentioned embodiment, it has been described that the image sensor 31 includes six light receiving units 71 to 76. In the present invention, as long as the image sensor 31 includes a plurality of light receiving units, the same advantageous effects may be achieved by applying the present invention in the same manner as the above-mentioned embodiment no matter if the number of light receiving units is even or odd.

Similarly, even when each of the light receiving units constituting the image sensor 31 consist of at least three light receiving ICs, the same advantageous effects may be achieved by applying the present invention in the same manner as the above-mentioned Modified Form 2.

In the above-mentioned embodiment, the image scanner 5 including both FB and ADF is illustrated. However, even when an image scanner including either of FB or ADF, the structure of the present invention may be applied.

Also, in the above-mentioned embodiment, it is explained that the scanning head 11 is of a CIS system. However, even when it is of a CCD system in which a mirror is disposed to an optical system, the same advantageous effects can be achieved by applying the invention in the same manner as the above-mentioned embodiment.

What is claimed is:

1. An image scanner, comprising:
   a plurality of light receiving units that receive reflected light from an object to be scanned per each pre-divided area;
   a signal processing device that processes output signals from each of the light receiving units to generate image data;
   a connector that is connected to a plurality of output signal lines from the light receiving units so that the output signal lines are collectively connected to the signal processing device via the connector; and
   a determination device that receives the output signals from each of the light receiving units to the signal processing device via the connector, and determines whether the output signals from each of the light receiving units to the signal processing device are normal based on a signal level of the output signals,
   wherein the plurality of light receiving units are arranged in a line along a main scanning direction, and
   wherein the determination device selects output signals corresponding to pixels within a partial area, of which a start point and an end point are set so as to straddle between neighboring light receiving units, from an entire light receiving area along the main scanning direction.

2. The image scanner according to claim 1,
   wherein each of the light receiving units is configured so as to sequentially provide each of the output signals from a plurality of pixels within a light receiving area assigned to each of the light receiving units respectively via each of the output signal lines in a time-sharing manner, and
   wherein the determination device selects output signals corresponding to a predetermined part of the pixels among all pixels of each of the light receiving units, and determines whether the output signals from each of the light receiving units to the signal processing device are normal based on the selected output signals.

3. A copying apparatus comprising:
   the image scanner according to claim 1, and
   an image forming apparatus that forms an image based on image data generated in the image scanner.

4. The image scanner according to claim 1, wherein the light receiving area, from which the determination device selects the output signals from each of the light receiving units, is set at one location per each of the light receiving units.

5. The image scanner according to claim 1, further comprising an annunciation device that announces the light receiving unit to be determined as having abnormity, when the determination device determines that the output signals provided to the signal processing device have abnormity.

6. The image scanner according to claim 1, wherein the determination device stops an abnormity determination operation by the determination device after abnormity of the output signals has been detected.

7. The image scanner according to claim 1, further comprising a plurality of light sources that illuminate light to the object to be scanned, each of the light sources illuminating the light with a different color, and
   wherein the light is sequentially illuminated from each of the light sources to the object to be scanned, and the determination device determines whether the output signals from each of the light receiving units to the signal processing device are normal per each of the light sources so as to determine whether the light sources have abnormity based on the determination result.

8. The image scanner comprising:

a plurality of light receiving units that receive reflected light from an object to be scanned per each pre-divided area;

a signal processing device that processes output signals from each of the light receiving units to generate image data;

a connector that is connected to a plurality of output signal lines from the light receiving units so that the output signal lines are collectively connected to the signal processing device via the connector; and a determination device that receives the output signals from each of the light receiving units to the signal processing device via the connector, and determines whether the output signals from each of the light receiving units to the signal processing device are normal based on a signal level of the output signals, wherein the plurality of light receiving units are arranged in a line along the main scanning direction, and in addition, at least a part of the light receiving units include a plurality of light receiving ICs, and wherein the determination device selects output signals corresponding to pixels within a partial area, of which a start point and an end point are set so as to straddle between neighboring light receiving ICs, from an entire light receiving area including the plurality of light receiving ICs within each of the light receiving units.

9. A copying apparatus comprising:

the image scanner according to claim 8, and an image forming apparatus that forms an image based on image data generated in the image scanner.

10. The image scanner according to claim 8, wherein the light receiving area, from which the determination device selects output signals from each of the light receiving units, is set at one location per each of the light receiving ICs.

11. The image scanner according to claim 8, further comprising an annunciation device that announces the light receiving unit to be determined as having abnormity, when the determination device determines that the output signals provided to the signal processing device have abnormity.

12. The image scanner according to claim 8, wherein the determination device stops an abnormity determination operation by the determination device after abnormity of the output signals has been detected.

13. The image scanner according to claim 8, further comprising a plurality of light sources that illuminate light to the object to be scanned, each of the light sources illuminating the light with a different color, and wherein the light is sequentially illuminated from each of the light sources to the object to be scanned, and the determination device determines whether the output signals from each of the light receiving units to the signal processing device are normal per each of the light sources so as to determine whether the light sources have abnormity based on the determination result.

* * * * *